Sept. 14, 1926.  1,600,004
H. W. KLEIST
STUFFING BOX FOR COMPRESSORS
Filed May 28, 1925
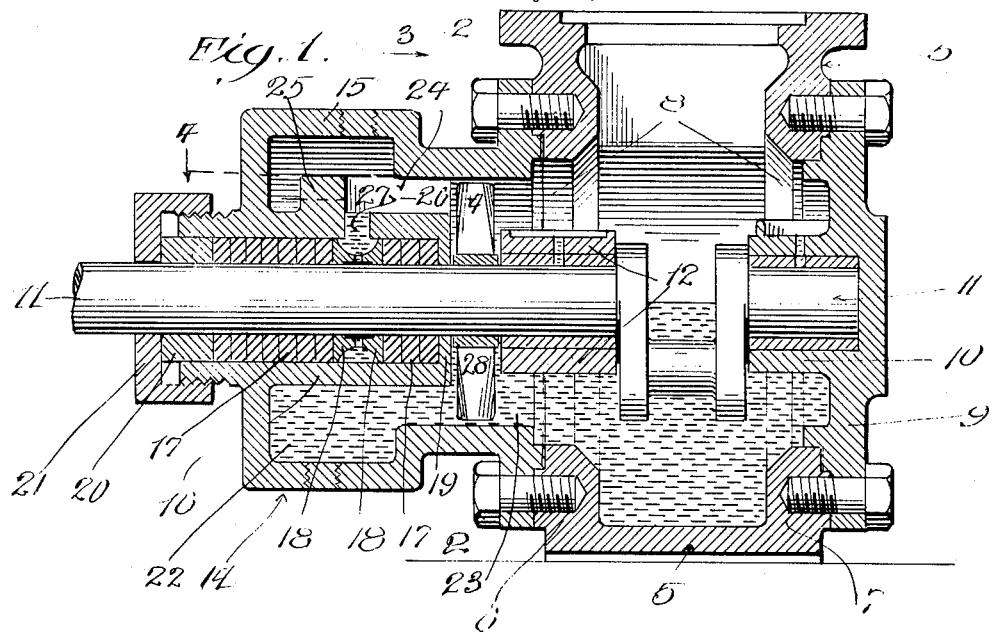
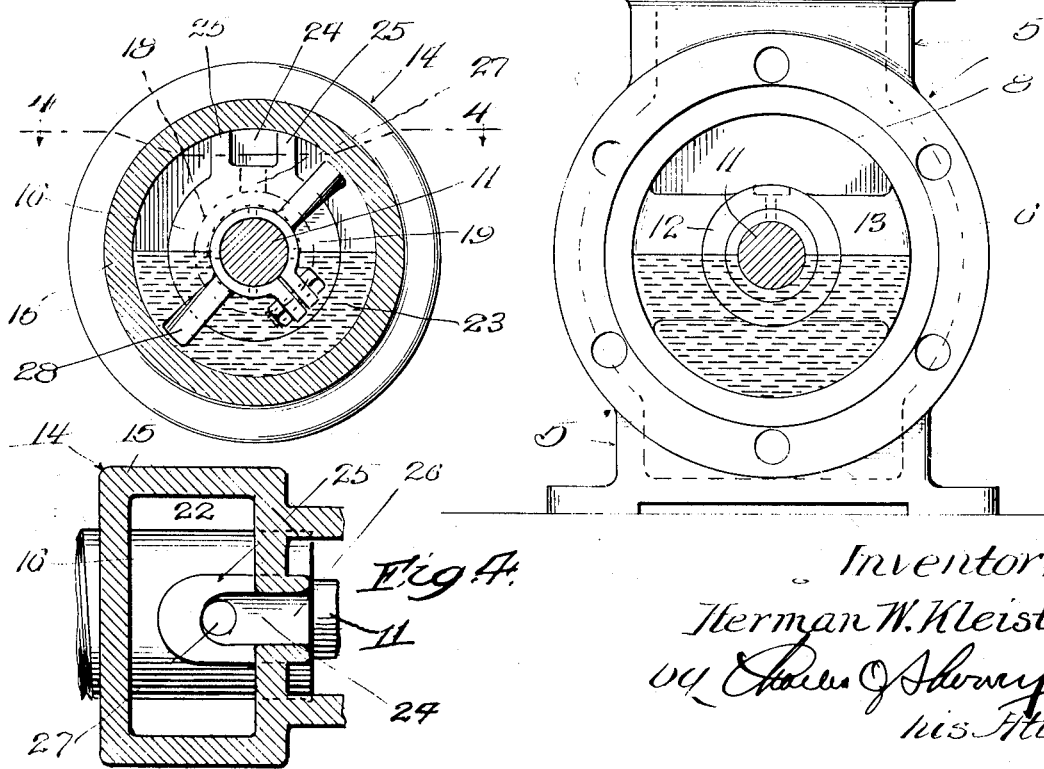
Inventor:
Herman W. Kleist,
by Charles J. Harvey
his Atty.

Patented Sept. 14, 1926.

1,600,004

UNITED STATES PATENT OFFICE.

HERMAN W. KLEIST, OF CHICAGO, ILLINOIS.

STUFFING BOX FOR COMPRESSORS.

Application filed May 28, 1925. Serial No. 33,332.

This invention relates to stuffing boxes for compressors and its principal object is to provide improved means for preventing the escape of gas from the crank shaft bearings of gas compressors, particularly of that type employed in refrigerating machinery. Another object is to prevent the crank shaft and bearing from rapid and excessive wear.

As is well known, there has always been a potential leak around the crank shafts of ammonia gas compressors and this has been especially noticeable when the compressor is stopped after having been run for some time, because the gas is then under a relatively high pressure and it leaks past the piston of the compressor, entering the crank case and finding its way out through the stuffing box around the crank shaft. I have found that one reason why the ordinary stuffing boxes are ineffective in preventing leakage of the gas is that when the crank shaft bearing and stuffing box comprise one unit which is bolted to the crank case, it is almost impossible to line up the crank shaft in its bearing, with the result that the vibration caused when running at high speed wears the packing material in the stuffing box and the gas is thereby permitted to leak out of the crank case.

In accordance with the present invention, the crank shaft bearing of the compressor at the side where the crank shaft protrudes from the crank case is made integral with the case, whereby when once accurately machined, the bearing remains so, inasmuch as none of its parts have to be disturbed. The stuffing box is made separate from and independent of the bearing and has associated therewith a paddle device or the like which dips into the lubricating oil, contained in the crank case and stuffing box, and feeds it to a cup or passage that leads to the packing chamber of the stuffing box where it flows around the crank shaft and effectively seals the parts against the escape of the ammonia gas. When the compressor is stopped, the oil remaining in said cup or passage is sufficient to maintain the necessary oil around the crank shaft to prevent any leakage of gas past the same. The invention consists in the several novel features hereinafter fully set forth and claimed.

The invention is clearly illustrated in the drawing accompanying this specification, in which:—

Fig. 1 is a central longitudinal section through the crank case of an ammonia gas compressor and showing a simple embodiment of my invention applied thereto; Fig. 2 is a vertical cross section taken on the line 2—2 of Fig. 1; Fig. 3 is a side elevation of the crank case looking in the direction of the arrow 3 in Fig. 1, with the stuffing box removed; and Fig. 4 is a horizontal section taken on the line 4—4 of Figs. 1 and 2.

Referring to said drawing, the reference character 5 designates the body part of the crank case portion of an ammonia gas compressor of the type used in refrigerating machinery. The sides 6, 7 thereof, are formed with openings 8, one of which is closed by a bearing head 9 bolted to the side 7. The head 9 is formed with a bearing 10 for one end of the crank shaft 11. The other bearing 12 for said crank shaft is made integral with the open side 6 and as shown is formed upon a cross bar or bracket 13 that extends across the opening in said side 6. The bearings 10, 12 are lined with Babbitt or other antifriction metal bushings to provide smooth bearing surfaces for the crank shaft. By making the bearing 12 integral with the crank case body, the shaft may be accurately lined up in the crank case and when once lined up, it remains in such position, because the bearings are not disturbed thereafter. The crank shaft projects out through the open side 6 of the crank case body and is connected by belts, or otherwise, to some suitable source of power, as for instance an electric motor.

The outer face of the open side 6 of the crank case body is machined and removably secured to said side by bolts or otherwise, is the stuffing box 14. Said stuffing box is entirely free from and independent of the bearing 12, and its interior is always in open communication with the interior of the crank case, whereby a comparatively large chamber is provided for the lubricating oil in the crank case. The stuffing box 14 is formed with an outer wall 15, and a packing holding housing 16 made coaxial with the wall 15 and arranged to contain metallic or other suitable packing 17 and a lantern ring 18. One end of the housing 16 is closed by an end wall 19 having an opening through which the shaft extends and on the other end of the housing 16 is a gland 20 and a nut 21 for compressing the packing upon and around the shaft 11. Between the wall 15 and housing 16 is an annular oil chamber 22, which is somewhat reduced in diameter as at 23, and on the top of the housing 16 is a trough 24 formed by ribs 25 that are cast on the housing 16. Said trough opens out as at 26 to the part 23 of the oil chamber 22 and at its other end terminates in an oil passage or cup 27 that leads to the lantern ring 18. The lantern ring is of the usual form, comprising a ring like structure that fits the shaft and is grooved circumferentially on its outer and inner sides to provide oil passages, which are connected by holes. Oil which enters the trough and cup, flows into the grooves in the lantern rings and seals the shaft against the passage of gas.

Means are provided for continuously supplying oil to the lantern ring while the compressor is in operation and, as shown, said means comprises a paddle device 28 located between the housing 16 and bearing 12, and secured upon a crank shaft. The blades of the paddle device may be twisted slightly to direct the flow of oil towards the oil trough 24.

It will be observed that when the parts are at rest, the oil passage or cup 27 and grooves around the lantern ring and between the lantern ring and shaft remain filled with oil. The gas pressure in the crank case and stuffing box is exerted on the surface of the oil therein and in the cup 27. The presence of oil between the lantern ring and shaft is sufficient to keep the gas from leaking past.

Because of the spaced relation between the crank shaft bearing 12 and packing holding housing 16 there is no danger that metal particles squeezed away from or torn away from the metallic packing will enter the bearing 12. In devices where the crank shaft bearing and stuffing box are made integral, it frequently occurs that the metallic packing material is squeezed into the bearing, with the result that the shaft and bearing are scored and rapidly worn away. In the present case any metallic particles that are worn away from the packing fall into the oil chamber around the packing holding housing 16 and lodge on the bottom of the outer stuffing box wall 15.

By providing the annular oil chamber around the housing 16 more oil may be put into the crank case at one time and therefore the crank case need not be filled with oil so often as is usual. Furthermore, by providing an oil chamber around the housing 16, the latter is kept cool by the oil surrounding it.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. The combination of the crank case body of an ammonia gas compressor having a crank shaft bearing at one side cast integral therewith and an annular opening in said side around said bearing, a crank shaft journaled in said bearing, a chambered stuffing box bolted to said open side of the crank case body and closing the opening therein, said stuffing box having a packing holding housing surrounding said crank shaft and entirely separate from and spaced away from said bearing by an intervening gap, a lantern ring, and metallic packing disposed on either side of said lantern ring in said housing, and means for compressing the packing around said shaft, said stuffing box having an annular oil chamber surrounding said housing and serving as an auxiliary oil supply chamber in open communication through said annular opening with the interior of the crank case and there being an oil passage on the top wall of said housing opening from the interior of said crank case body and extending through said top wall of the housing and terminating above said lantern ring.

2. The combination of the crank case body of an ammonia gas compressor having a crank shaft bearing at one side cast integral therewith and an opening in said side around said bearing, a crank shaft journaled in said bearing, a stuffing box bolted to said open side of the crank case body and closing the opening therein, said stuffing box having a packing holding housing surrounding said crank shaft, and entirely separate from and spaced away from said bearing by an intervening gap, a lantern ring and packing in said housing, an oil cup in the top of said housing leading to said lantern ring, and a paddle on said crank shaft for forcing oil to said oil cup.

3. The combination of the crank case body of an ammonia gas compressor having a crank shaft bearing at one side cast integral therewith and an annular opening in said side around said bearing, a crank shaft journaled in said bearing, and a chambered stuffing box entirely separate from and independent of said bearing and having a lantern ring and metallic packing holding housing in the chamber of the stuffing box surrounding said crank shaft and formed with an end wall adjacent said bearing but spaced away from said bearing by a gap intervening the housing and bearing.

4. The combination of the crank case body of an ammonia gas compressor having a crank shaft bearing on one side cast integral therewith and an opening in said side around said bearing, a crank shaft journaled in said bearing, a chambered stuffing box bolted to said open side of the crank case and closing the opening therein, said stuffing box having a packing holding housing in the chamber of the stuffing box and formed with an end wall adjacent but entirely separate from said bearing and there being a gap between said housing and bearing, metallic packing and a lantern ring contained in said housing and means for compressing said metallic packing around the shaft, there being an oil passage leading from the interior of said crank case body to said lantern ring.

HERMAN W. KLEIST.